United States Patent
Schultz et al.

(10) Patent No.: US 11,180,179 B2
(45) Date of Patent: Nov. 23, 2021

(54) STEERING COLUMN ADJUSTMENT LEVER ASSEMBLY DAMPENER

(71) Applicant: Steering Solutions IP Holding Corporation, Saginaw, MI (US)

(72) Inventors: Zachery P. Schultz, Munger, MI (US); Gregory E. Kociba, Saginaw, MI (US); Brian K. Rood, Corunna, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 2 days.

(21) Appl. No.: 16/884,201

(22) Filed: May 27, 2020

(65) Prior Publication Data

US 2021/0229734 A1 Jul. 29, 2021

Related U.S. Application Data

(60) Provisional application No. 62/966,817, filed on Jan. 28, 2020.

(51) Int. Cl.
*B62D 1/184* (2006.01)

(52) U.S. Cl.
CPC .................. *B62D 1/184* (2013.01)

(58) Field of Classification Search
CPC ...................................... B62D 1/184
See application file for complete search history.

(56) References Cited

U.S. PATENT DOCUMENTS 9,150,240 B2 10/2015 Schnitzer et al.
10,449,990 B2 * 10/2019 Dasadi .................. B62D 1/184

FOREIGN PATENT DOCUMENTS

| CN | 107444467 A | * | 12/2017 | ............. B62D 1/195 |
| CN | 111169527 A | * | 5/2020 | ............. B62D 1/187 |
| KR | 20160094093 A | * | 8/2016 | |
| WO | WO-2016091642 A1 | * | 6/2016 | ............. B62D 1/185 |

* cited by examiner

*Primary Examiner* — Drew J Brown
(74) *Attorney, Agent, or Firm* — Dickinson Wright PLLC

(57) ABSTRACT

A dampened adjustment assembly for a steering column includes a lever rotatable to move the dampened adjustment assembly between a locked position and an unlocked position. The dampened adjustment assembly also includes a clamp bolt operatively coupled to the lever. The dampened adjustment assembly further includes a cam operatively coupled to the clamp bolt and disposed within a pocket of a lower jacket. The dampened adjustment assembly yet further includes a dampening component formed of a dampening material and surrounding a perimeter of the cam, the dampening component positioned to contact a surface of the lower jacket to define the unlocked position.

16 Claims, 10 Drawing Sheets

STEERING COLUMN ADJUSTMENT LEVER ASSEMBLY DAMPENER

CROSS-REFERENCE TO RELATED APPLICATION

This application claims the benefit of priority to U.S. Provisional Patent Application Ser. No. 62/966,817, filed Jan. 28, 2020, the disclosure of which is incorporated by reference herein in its entirety.

BACKGROUND

Steering columns are often manually adjustable to satisfy operator preferences. Such steering columns provide a release mechanism, such as a lever, that an operator can handle to move between a locked position and an unlocked position of the steering column. The locked position fixes the steering column in a stationary position. The unlocked position allows manual adjustment of the steering column.

As with all sounds associated with vehicle operation, vehicle manufacturers are interested in preventing undesirable noise that occurs during operation of the adjustment lever. Some adjustment assemblies involve a metal-to-metal contact position during operation that results in an audible sound that may be deemed undesirable. Some adjustment assemblies include two powered metal cams interfaced to create the stop for the lever when moved to the unlocked position. Some adjustment assemblies include an apparatus or decelerator that is designed to slow the lever speed when unlocking, but it does not account for different lever speeds and does not provide a consistent soft stop. The prior assemblies may be composed of a plastic design, which limits the amount of energy that can be absorbed during the unlocking of the release mechanism.

SUMMARY OF THE DISCLOSURE

According to one aspect of the disclosure, a dampened adjustment assembly for a steering column includes a lever rotatable to move the dampened adjustment assembly between a locked position and an unlocked position. The dampened adjustment assembly also includes a clamp bolt operatively coupled to the lever. The dampened adjustment assembly further includes a cam operatively coupled to the clamp bolt and disposed within a pocket of a lower jacket. The dampened adjustment assembly yet further includes a dampening component formed of a dampening material and surrounding a perimeter of the cam, the dampening component positioned to contact a surface of the lower jacket to define the unlocked position.

According to another aspect of the disclosure, a dampened adjustment assembly for a steering column includes a lever rotatable to move the dampened adjustment assembly between a locked position and an unlocked position. The dampened adjustment assembly also includes a clamp bolt operatively coupled to the lever. The dampened adjustment assembly further includes a cam operatively coupled to the clamp bolt and disposed within a pocket of a lower jacket. The dampened adjustment assembly yet further includes a dampening bumper formed of a dampening material, at least a portion of the dampening bumper disposed within the pocket and positioned to be contacted by the cam to define the unlocked position.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various embodiments of the invention disclosed herein are shown.

Figure 1:
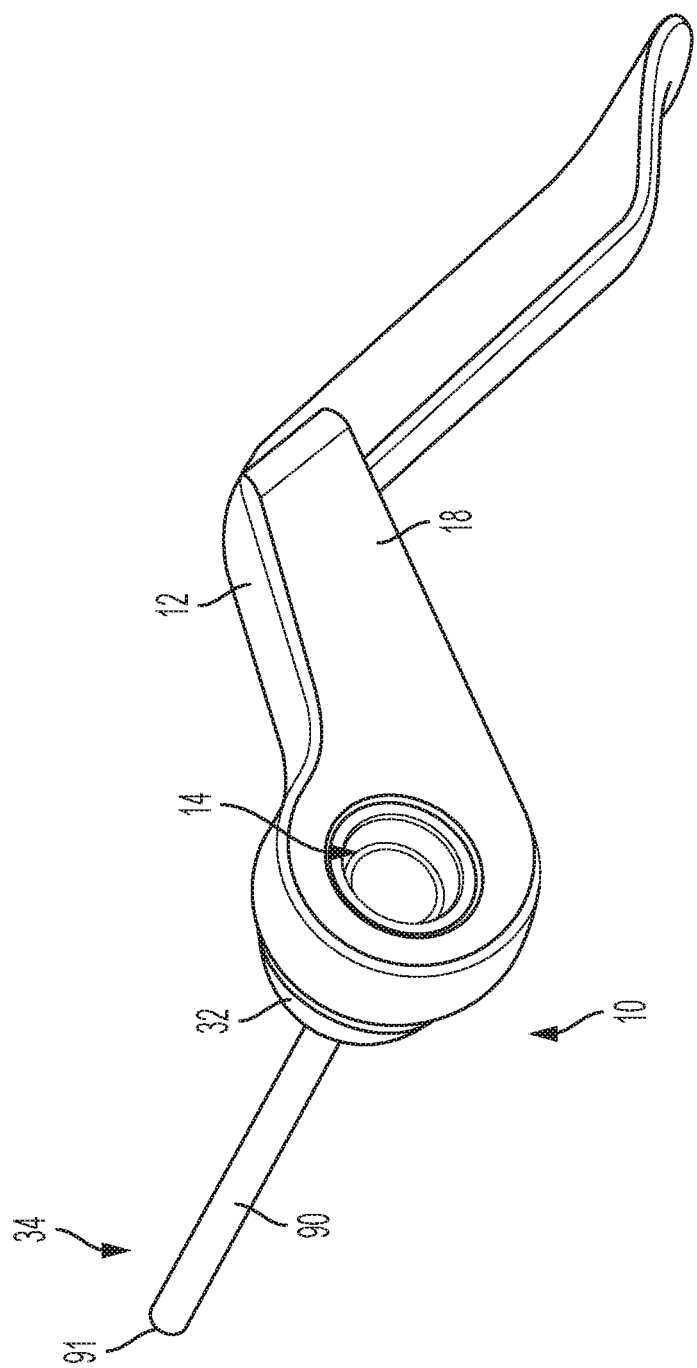
FIG. 1 is a perspective view of a portion of a steering column adjustment lever assembly.

Referring now to FIG. 1, an adjustment assembly 10 for a manually adjustable steering column is shown. A rotatable lever 12 is configured to actuate the adjustment assembly 10 between a locked condition and an unlocked condition. The rotatable lever 12 is an extension of the adjustment assembly 10 into a cabin (not shown) of the motor vehicle, the lever 12 being accessible to a driver (not shown). The driver may engage the lever 12 in order to transition the steering column from the locked condition to an unlocked condition or vice versa. In an unlocked condition, the position of the steering column is adjustable and, when rotated into a locked condition, the position of the steering column is fixed.

The rotatable lever 12 defines an aperture 14 that extends from an inner face of the lever 12 to an outer face 18 of the lever 12. The adjustment assembly 10 also includes a cam that may be partially or fully disposed within the aperture 14 of the lever 12 and a clamp bolt 34. The clamp bolt 34 extends through the lever 12 and the cam. The cam is an instrument for converting rotation of the lever 12 to a linear force along the axis of the bolt 34 to clamp the steering column assembly. The clamp bolt 34 includes a bolt shank 90 with an end point 91 and a bolt head, with the bolt head coupled to the lever 12.

Figure 3:
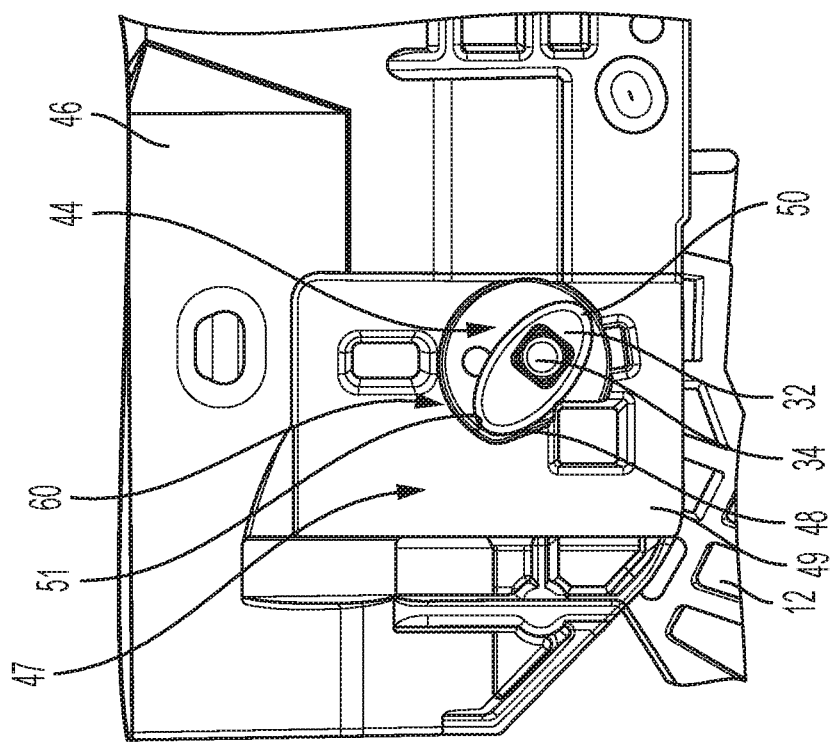
FIG. 3 is an elevational view of the dampening assembly of FIG. 2, the adjustment lever assembly in an unlocked position.
Figure 2:
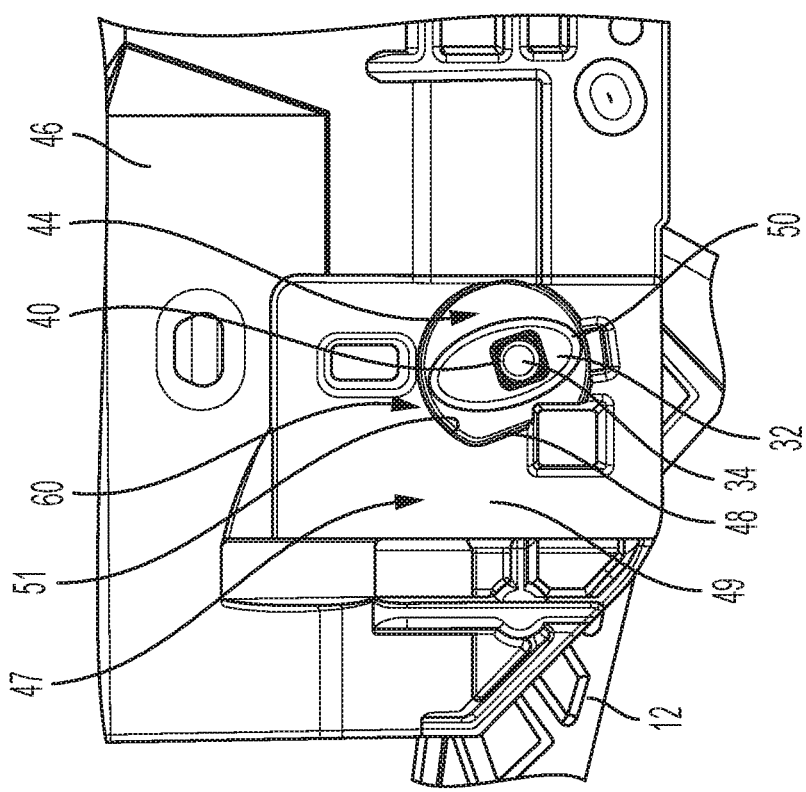
FIG. 2 is an elevational view of the steering column adjustment lever assembly with a dampening assembly according to one aspect of the disclosure, the adjustment lever assembly in a locked position.
Figure 4:
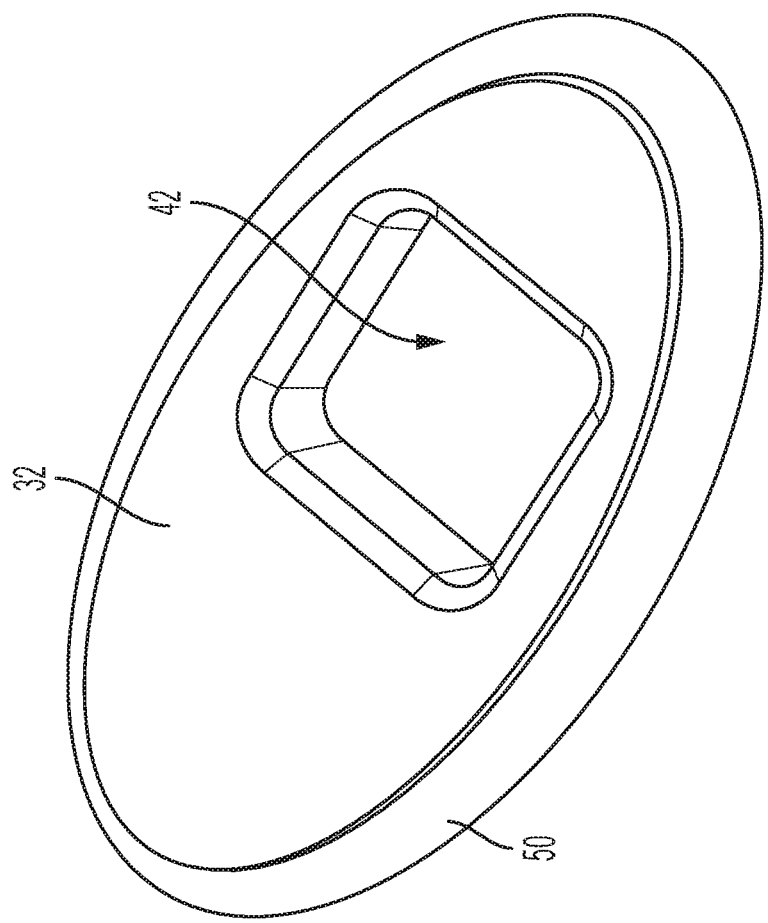
FIG. 4 is a perspective view of the dampening assembly of FIGS. 2 and 3.

Referring now to FIGS. 2-4, a portion of the adjustment assembly 10 is illustrated to show sound dampening components of the assembly which form what may be referred to herein as a dampening assembly 60. A cam 32 of the adjustment assembly 10 is shown in the locked position in FIG. 2 and in the unlocked position in FIG. 3.

FIGS. 2 and 3 illustrate the clamp bolt 34 and the cam 32 at least partially disposed within a pocket 44 of a lower jacket 46 of the steering column. The pocket 44 is formed on an inner surface 47 of a wall 49 of the lower jacket 46. In the illustrated embodiment, the lever 12 is located on an opposite side of the lower jacket 46, relative to the wall 49, but it is to be appreciated that the lever 12 may be located on the same side of the lower jacket 46, relative to the wall 49.

As shown, the clamp bolt 34 includes a portion thereof that has a non-circular cross section that is referred to as a cam engagement portion 40. In the illustrated embodiment, the cam engagement portion 40 has a substantially square cross-section, but it is to be appreciated that alternative non-circular geometries are contemplated. The cam engagement portion 40 extends through an aperture 42 (shown in FIG. 4) defined by the cam 32, with the aperture 42 having a geometry that substantially corresponds to the cross-section of the cam engagement portion 40. Therefore, rotation of the clamp bolt 34 results in rotation of the cam 32 to dampen lock or unlock movements of the overall column adjustment assembly.

The pocket 44 is a recess defined within the inner surface 47 of the wall 49 of the lower jacket 46. A pocket wall 51 that extends inwardly to partially define the pocket 44 includes a shelf 48 that serves as a contact surface for interaction with the cam 32. The shelf 48 defines an unlocked position location of the cam 32. The cam 32 and the lower jacket 46 are metallic components. To avoid an audible metallic sound during operation, the assembly includes a dampening component 50 that is the material that contacts the shelf 48. In the illustrated embodiment, the dampening component 50 is operatively coupled to the cam 32. In other words, the dampening component 50 is assembled to the cam 32. The dampening component 50 may be an O-ring, a sleeve, or any other suitable component that may be fitted over the perimeter of the cam 32.

In operation, when the lever 12 is moved to the unlocked position, the cam 32 rotates, until the dampening component 50 contacts the shelf 48, thereby providing a soft, dampened stop for the lever 12.

Figure 5:
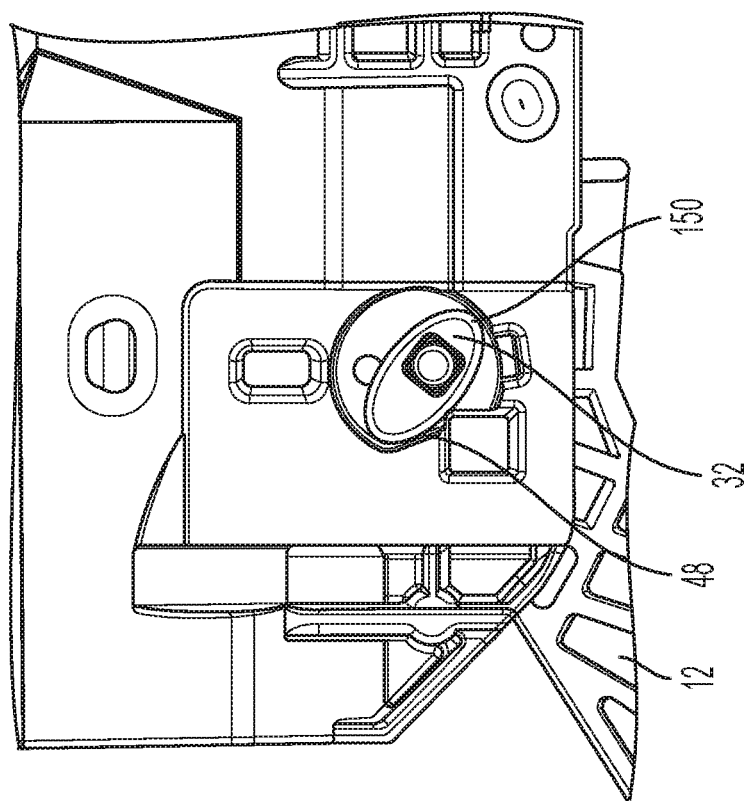
FIG. 5 is an elevational view of the steering column adjustment lever assembly with the dampening assembly according to another aspect of the disclosure, the adjustment lever assembly in a locked position.
Figure 6:
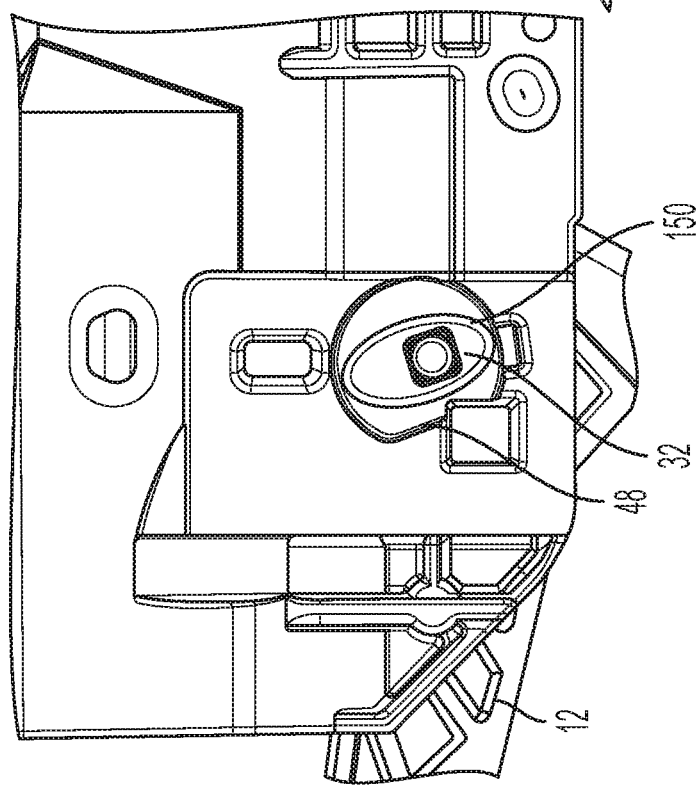
FIG. 6 is an elevational view of the dampening assembly of FIG. 5, the adjustment lever assembly in an unlocked position.
Figure 7:
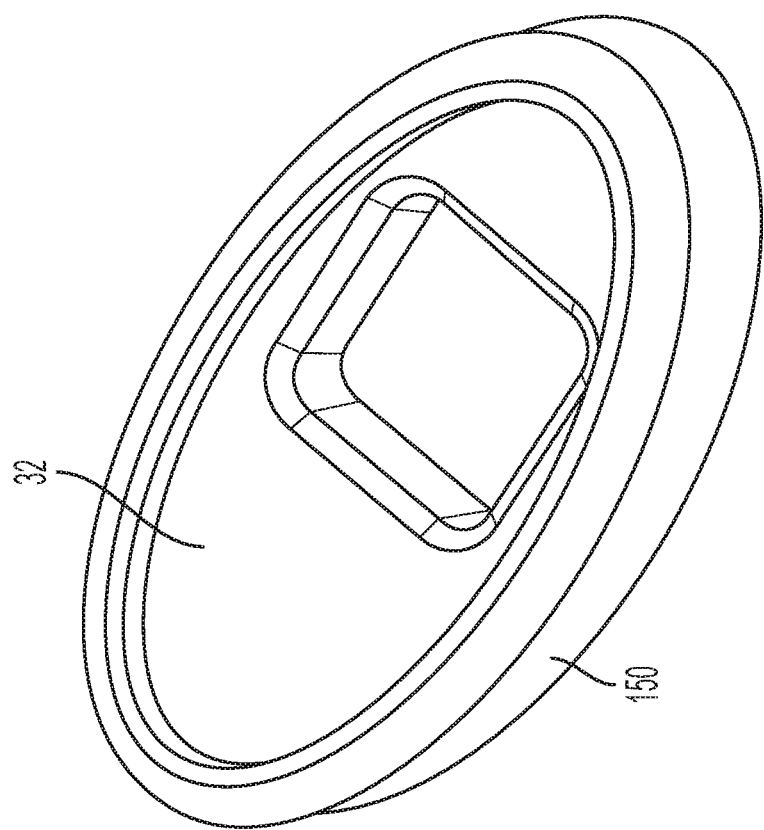
FIG. 7 is a perspective view of the dampening assembly of FIGS. 5 and 6.

Referring now to FIGS. 5-7, it is shown that a dampening component 150 may be integrally formed with the cam 32. For example, the dampening material 150 may be overmolded to the cam 32. As with the embodiment of the dampening component 50 of FIGS. 2-4, the cam 32 rotates until the dampening component 150 contacts the shelf 48, thereby providing a soft, dampened stop for the lever 12. FIG. 5 shows the cam 32 in the locked position and FIG. 6 shows the cam 32 in the unlocked position.

Figure 9:
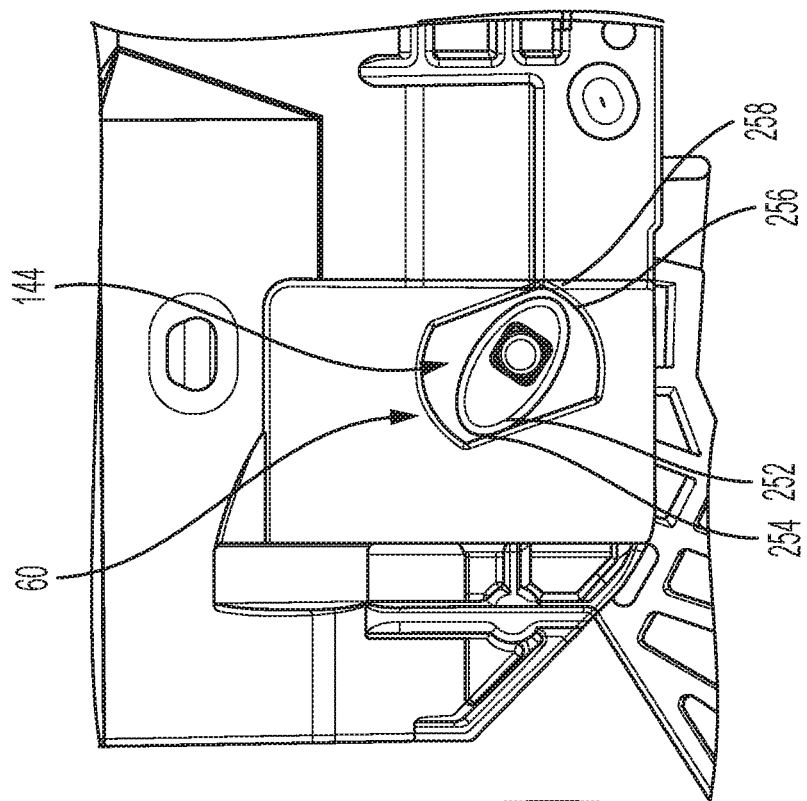
FIG. 9 is an elevational view of the dampening assembly of FIG. 8, the adjustment lever assembly in an unlocked position.
Figure 8:
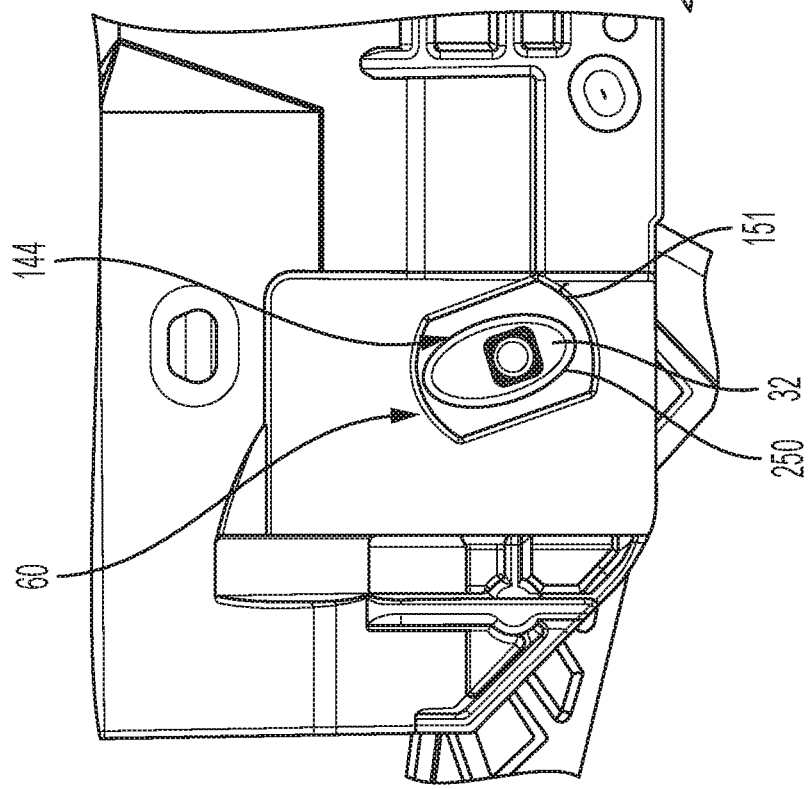
FIG. 8 is an elevational view of the steering column adjustment lever assembly with the dampening assembly according to another aspect of the disclosure, the adjustment lever assembly in a locked position.
Figure 10:
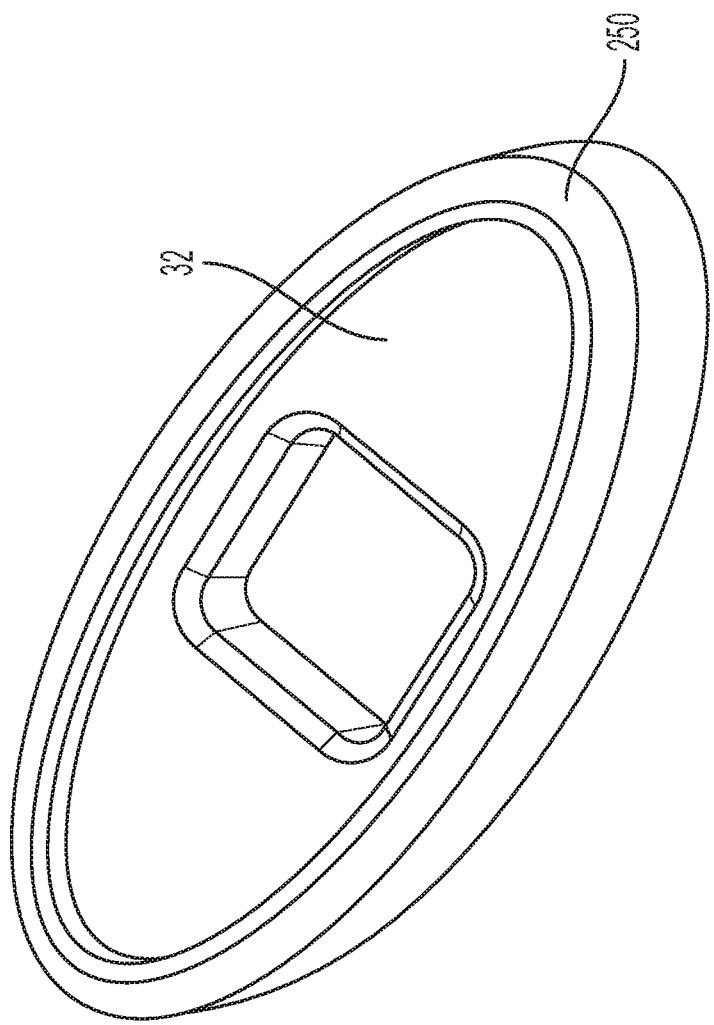
FIG. 10 is a perspective view of the dampening assembly of FIGS. 8 and 9.

FIGS. 8-10 illustrate another embodiment of the dampening assembly 60. In the illustrated embodiment, a pocket 144 and a pocket wall 151 is dimensioned such that two contact surfaces are provided for interaction with the cam 32 when the cam 32 is rotated to the unlocked position. The dampening component 250 may be operatively coupled to the cam 32, as described above in connection with FIGS. 2-4, or may be integrally formed with the cam 32, as described with FIGS. 5-7. The dampening material 250 includes a first portion 252 that contacts a first contact surface 254 of the pocket wall 151 and a second portion 256 that contacts a second contact surface 258 of the pocket wall 151 when the cam 32 is rotated to the unlocked position (FIG. 9). FIG. 8 shows the cam 32 in the locked position.

Figure 11:
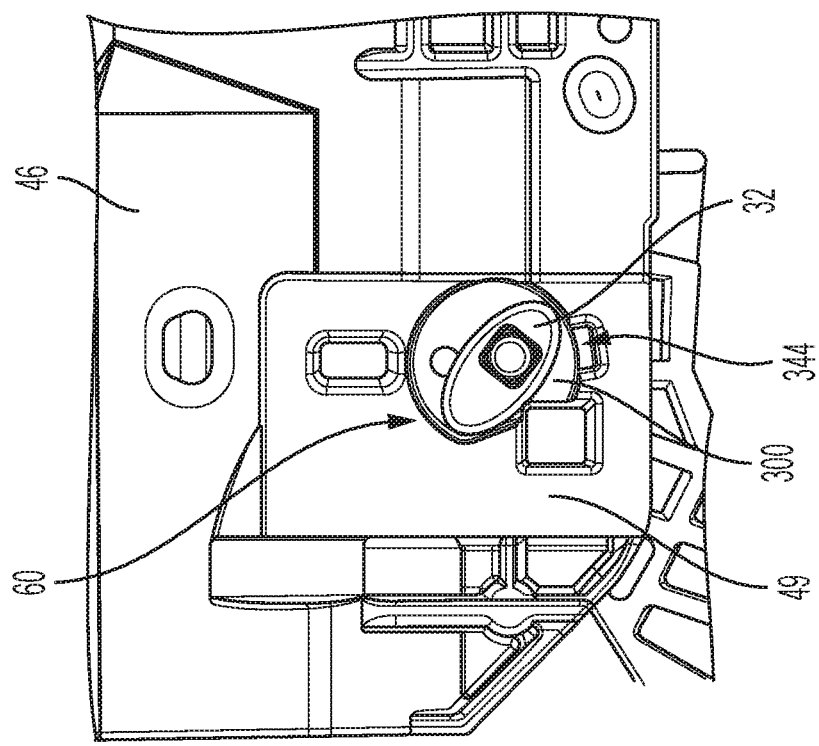
FIG. 11 is an elevational view of the steering column adjustment lever assembly with the dampening assembly according to another aspect of the disclosure, the adjustment lever assembly in a locked position.
Figure 12:
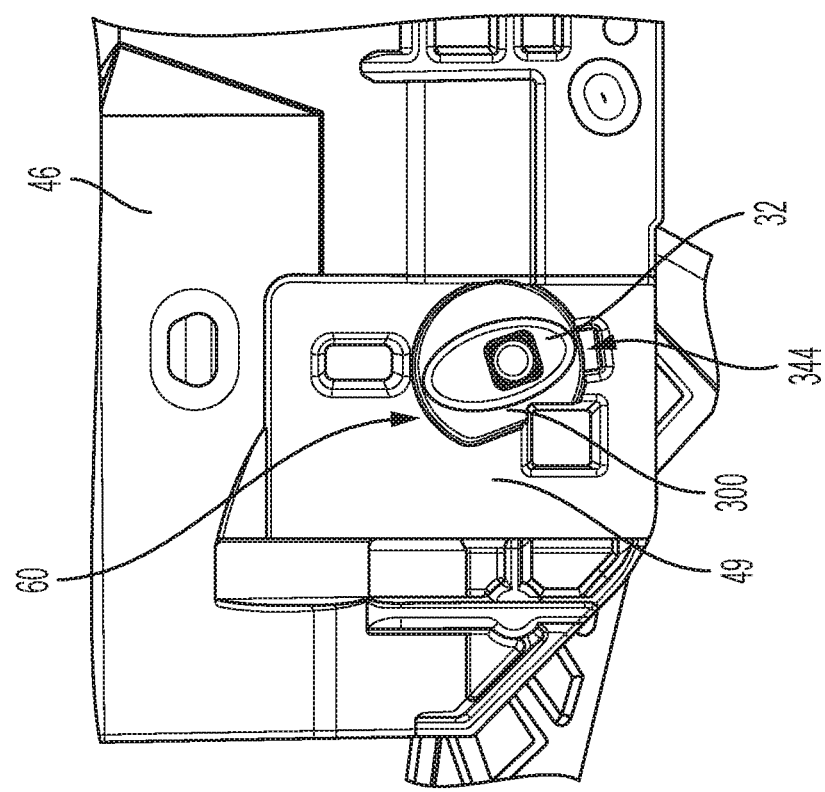
FIG. 12 is an elevational view of the dampening assembly of FIG. 11, the adjustment lever assembly in an unlocked position.
Figure 13:
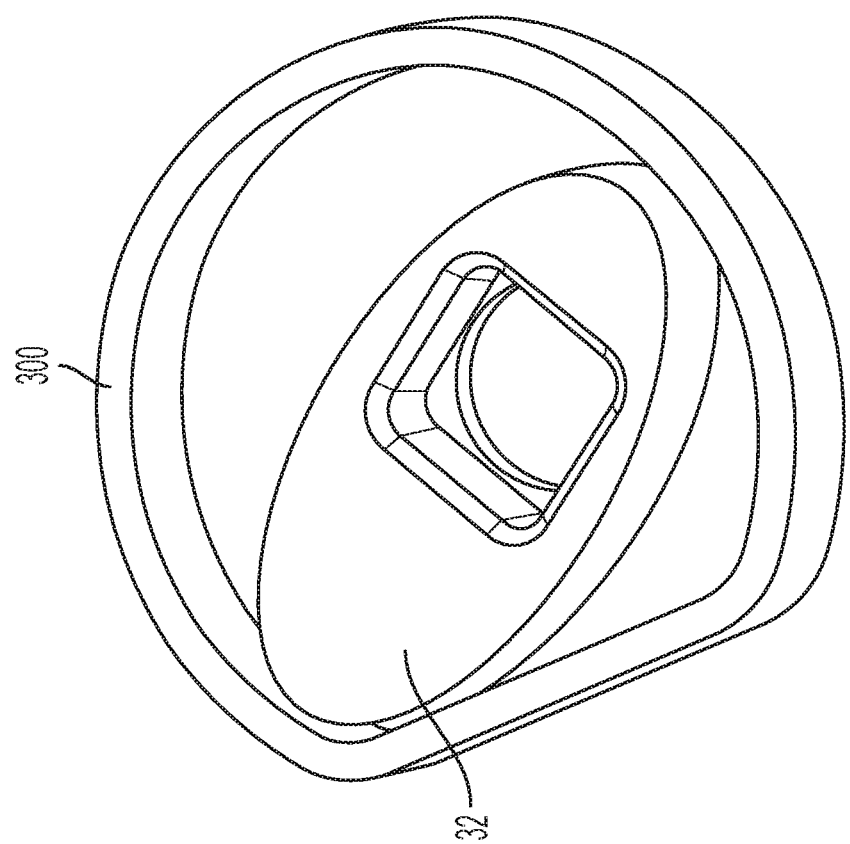
FIG. 13 is a perspective view of the dampening assembly of FIGS. 11 and 12.

FIGS. 11-13 illustrate another embodiment of the dampening assembly 60. In the illustrated embodiment, the cam 32 does not have a dampening component thereon. Rather, a bumper 300 that is formed of a dampening material serves as the dampening component. The bumper 300 is fitted within a pocket 344 that is recessed within the wall 49 of the lower jacket 46. The pocket 344 and the bumper 300 are dimensioned to provide at least one contact surface that defines the unlocked position of the cam 32 upon contact between the two during rotation from the locked position (FIG. 11) to the unlocked position (FIG. 12).

Figure 15:
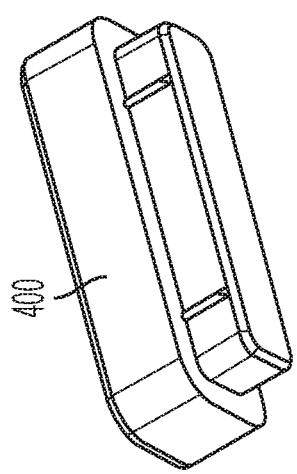
FIG. 15 is a perspective view of a bumper of the dampening assembly of FIG. 14.
Figure 16:
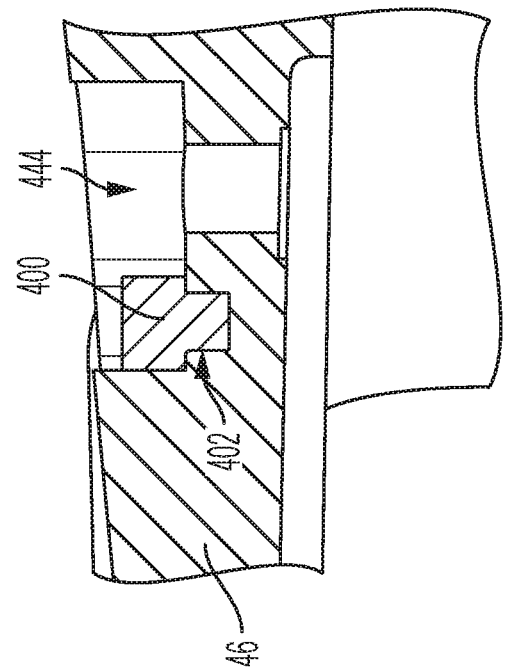
FIG. 16 is a cross-sectional view of the bumper installed in a column jacket.
Figure 14:
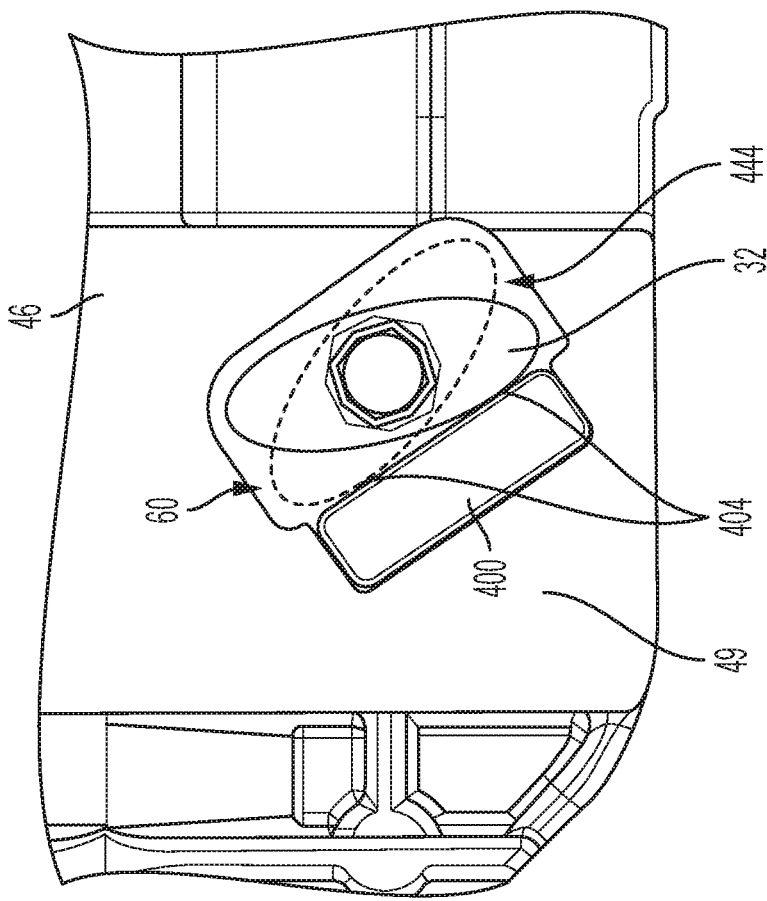
FIG. 14 is an elevational view of the steering column adjustment lever assembly with a dampening assembly.

FIGS. 14-16 illustrate another embodiment of the dampening assembly 60. In the illustrated embodiment, the cam 32 does not have a dampening component thereon. Rather, a bumper 400 that is formed of a dampening material serves as the dampening component. The bumper 400 is fitted within a pocket 444 that is recessed within the wall 49 of the lower jacket 46. The bumper 400 is not an insert that corresponds to the entire pocket geometry. Instead, the bumper 400 is press fit within a bumper recess 402 and provides a contact surface 404 that defines the unlocked position of the cam 32 upon contact between the two during rotation from the locked position to the unlocked position.

In any of the embodiments disclosed herein, the material of the dampening component could be one of several different non-metallic materials. The amount of force, inertia and momentum of the release mechanism, or lever 12, will dictate the material durometer, shape and thickness of the dampener. The dampening assembly could also be used as a decelerator if axial preload is placed on the assembly, thereby biasing the dampening component against the lower jacket 46 inside wall 49, creating drag on the system to slow the speed of the release mechanism.

Therefore, the assembly is advantageously flexible since it is tunable to multiple steering column embodiments and can provide both dampening and reduced release mechanism velocity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A dampened adjustment assembly for a steering column comprising:
   a lever rotatable to move the dampened adjustment assembly between a locked position and an unlocked position;
   a clamp bolt operatively coupled to the lever;
   a cam operatively coupled to the clamp bolt and disposed within a pocket of a lower jacket; and
   a dampening component formed of a dampening material and surrounding a perimeter of the cam, the dampening component positioned to contact a surface of the lower jacket to define the unlocked position.

2. The dampened adjustment assembly of claim 1, wherein the dampening component is a component separate from the cam and operatively coupled to the cam.

3. The dampened adjustment assembly of claim 2, wherein the dampening component is an O-ring.

4. The dampened adjustment assembly of claim 1, wherein the dampening component and the cam are integrally formed with each other.

5. The dampened adjustment assembly of claim 4, wherein the dampening component is over-molded on the cam.

6. The dampened adjustment assembly of claim 1, wherein the pocket is a recess within an inner surface of a wall of the lower jacket, the pocket partially defined by a pocket wall.

7. The dampened adjustment assembly of claim 6, wherein the surface that is contacted by the dampening component to define the unlocked position is a portion of the pocket wall.

8. The dampened adjustment assembly of claim 6, wherein the dampening component is positioned to have a pair of contact portions in contact with a pair of portions of the pocket wall in the unlocked position.

9. The dampened adjustment assembly of claim 1, wherein the clamp bolt includes a cam engagement portion disposed within an aperture of the cam, the cam engagement portion having a square cross-section.

10. The dampened adjustment assembly of claim 1, wherein the dampening component is preloaded against the lower jacket to frictionally decelerate rotation of the cam and the lever.

11. A dampened adjustment assembly for a steering column comprising:
   a lever rotatable to move the dampened adjustment assembly between a locked position and an unlocked position;
   a clamp bolt operatively coupled to the lever;
   a cam operatively coupled to the clamp bolt and disposed within a pocket of a lower jacket; and
   a dampening bumper formed of a dampening material, at least a portion of the dampening bumper disposed within the pocket and positioned to be contacted by the cam to define the unlocked position.

12. The dampened adjustment assembly of claim 11, wherein the dampening bumper comprises an insert that has a geometry corresponding to the pocket.

13. The dampened adjustment assembly of claim 11, wherein the pocket is a recess within an inner surface of a wall of the lower jacket.

14. The dampened adjustment assembly of claim 11, wherein the clamp bolt includes a cam engagement portion disposed within an aperture of the cam, the cam engagement portion having a non-circular cross-section.

15. The dampened adjustment assembly of claim 11, wherein the dampening bumper has a rectangular cross-section.

16. The dampened adjustment assembly of claim 11, wherein the dampening bumper has a square cross-section.

* * * * *